United States Patent [19]
Cantral et al.

[11] 3,736,988
[45] June 5, 1973

[54] DEPTH AND SIDE DRAFT CONTROL SYSTEM FOR AGRICULTURAL IMPLEMENTS

[75] Inventors: John Isaac Cantral; Robert Otto Taube, both of Moline, Ill.

[73] Assignee: Deere & Company, Moline, Ill.

[22] Filed: May 17, 1971

[21] Appl. No.: 143,938

[52] U.S. Cl. ..................172/7, 172/9, 172/239, 172/311, 172/413
[51] Int. Cl. ..............................A01b 63/112
[58] Field of Search..........................172/9, 7, 8, 4.5, 172/239, 413, 421, 450, 451, 311, 316; 280/461 A, 446 R; 60/97 E; 91/171

[56] References Cited
UNITED STATES PATENTS

| | | | |
|---|---|---|---|
| 2,755,722 | 7/1956 | Fraga | 172/239 |
| 3,523,699 | 8/1970 | Sinkulo et al. | 172/311 L |
| 3,630,290 | 12/1971 | Williams et al. | 172/7 |
| 3,057,092 | 10/1962 | Curlett | 172/239 X |
| 3,517,747 | 6/1970 | Fischer | 172/7 |
| 3,627,053 | 12/1971 | Hook et al. | 172/9 |
| 3,627,059 | 12/1971 | Jackson | 172/413 |
| 3,120,799 | 2/1964 | Strnad et al. | 60/47 E X |
| 3,175,837 | 3/1965 | Bobarb | 172/239 X |

*Primary Examiner*—Robert E. Pulfrey
*Assistant Examiner*—Stephen C. Pellegrino
*Attorney*—H. Vincent Harsha, Harold M. Knoth, William A. Murray, John M. Nolan, Raymond L. Hollister, Jimmie R. Oaks and John O. Hayes

[57] ABSTRACT

A control system for the outer sections of an integral flexible implement automatically adjusts the outer sections in response to deviations of the outer sections from a preselected position with respect to the ground surface. Provision is also made whereby one of the outer frame sections may selectively be made responsive to draft loads so that when unequal draft forces are imposed upon opposite sides of the tractor hitch, the one frame section is vertically adjusted to balance the draft loads on opposite sides of the tractor hitch. The control system also includes means to render the depth sensing and side draft sensing means inoperative and raise the outer frame sections on their gauge wheels to a raised transport position.

27 Claims, 7 Drawing Figures

3,736,988

DEPTH AND SIDE DRAFT CONTROL SYSTEM FOR AGRICULTURAL IMPLEMENTS

BACKGROUND OF THE INVENTION

The present invention relates generally to agricultural implements and more particularly relates to a depth control system for the outer sections of an integral flexible implement.

In order to keep agricultural implements compatible with the modern high horsepower tractor, the current trend has been toward wider implements which effectively utilize available horsepower and toward integral or semi-integral implements which provide additional weight on the rear wheels of a tractor. However, the wider integral implements have presented problems of their own. The wide implements must have sufficient flexibility to follow the ground contour and the integral implements must not add so much weight on the rear of the tractor that the front of the tractor is lightened to the point where steering control is lost.

The flexibility and weight problems of wide integral implements have been overcome by what may aptly be referred to as integral flexible implements. An integral flexible implement is one which has a center frame section mounted or semi-mounted on the tractor hitch and a pair of outer frame sections having inner ends pivotally connected to the sides of the center frame section and having their outer ends supported by gauge wheels. Although the integral flexible implements have sufficient flexibility to follow ground contour and have the gauge wheels which assist the tractor hitch in raising the implement so that the tractor hitch is not required to bear the entire weight of the implement, they have presented some problems in the depth control of the outer frame sections and also of coordinating the raising and lowering of the outer frame sections on their gauge wheels with the raising and lowering of the center frame section with the tractor three-point hitch.

SUMMARY OF THE INVENTION

The principal object of the present invention is to provide a depth control system for an integral flexible implement.

Another object of the present invention is to provide a depth control system for an integral flexible implement which optionally maintains both outer frame sections at a preselected position with respect to the ground surface or maintains one of the outer frame sections at a preselected position with respect to the ground surface and vertically adjusts the other frame section to maintain balanced draft loads on a tractor.

A further object of the present invention is to provide a depth control system for an integral flexible implement which automatically maintains the outer frame sections at a preselected position with respect to the ground surface and which can be rendered inoperative to raise the outer frame sections to a transport position.

Still another object of the present invention is to provide, for an integral flexible implement of the type having a center frame section integrally connected to a tractor three-point hitch, a control system for the outer frame sections which selectively senses the working position of the outer frame sections and maintains the outer frame sections at a preselected working position with respect to the ground surface or senses the working position of one of the frame sections and maintains the one frame section at a preselected working position with respect to the ground surface and senses the draft loads on a tractor hitch and vertically adjusts the other outer frame section to maintain balanced draft loads on opposite sides of the tractor hitch, and which includes means to selectively render the sensing means inoperative and raise the outer frame sections to a transport position.

The above objects and additional objects and advantages of the present invention will become apparent to those skilled in the art from a reading of the following detailed description when taken in conjunction with the accompanying drawings.

DESCRIPTION OF THE PREFERRED EMBODIMENT

Figures 1, 2, 3:
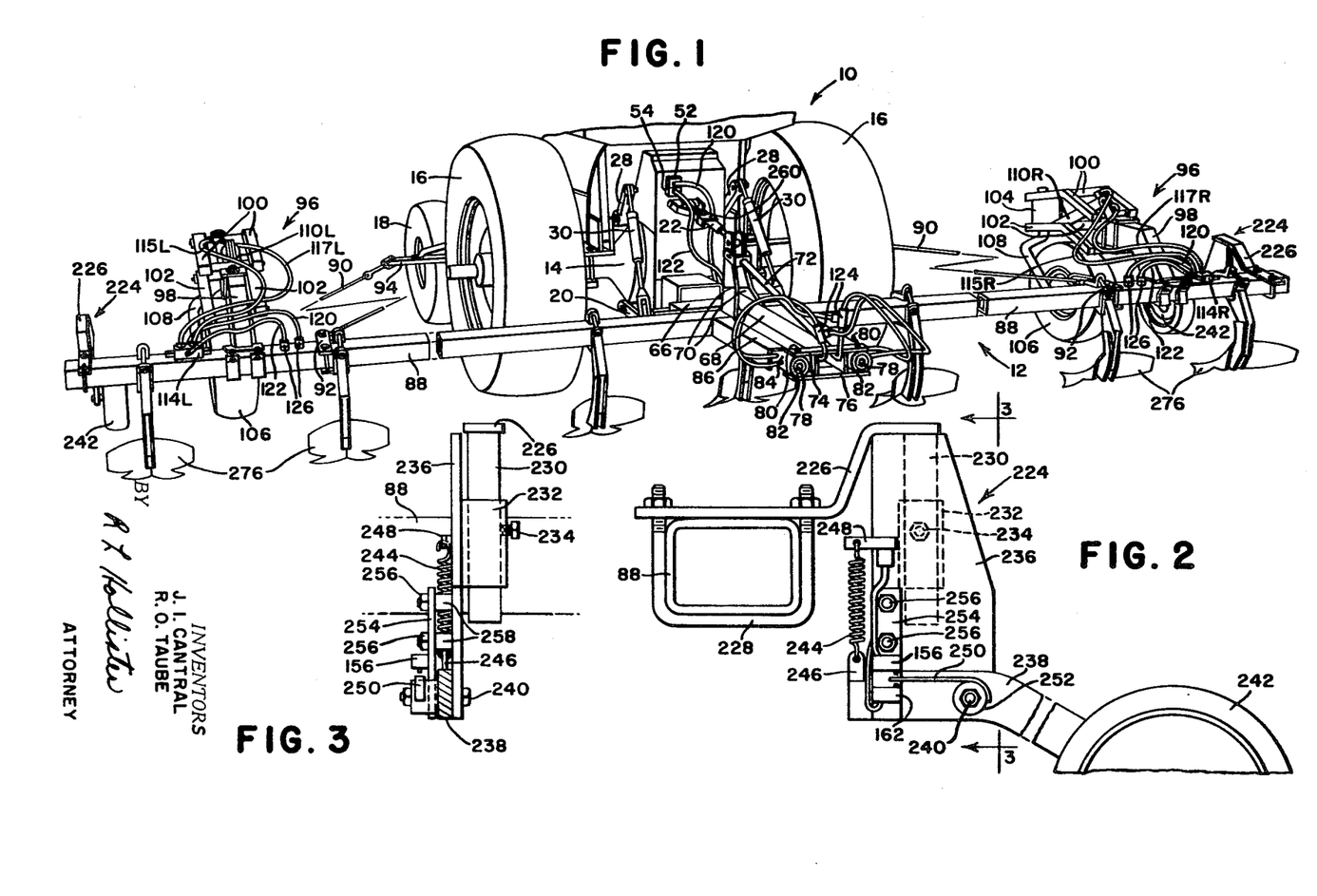
FIG. 1 is a perspective view of a tractor and integral flexible implement arrangement embodying the control system according to the present invention.
FIG. 2 is a side elevational view of one of the depth sensors employed in the present invention.
FIG. 3 is a view taken substantially along the line 3—3 of FIG. 2.

Referring to the drawings, there is disclosed therein a tractor indicated generally at 10 and an implement indicated generally at 12. The tractor 10 is of conventional construction and includes a main chassis 14 supported by rear traction wheels 16 and front steerable wheels 18. The tractor also has a conventional three-point hitch including a pair of lower draft links 20 and an upper compression link 22. The draft links 20 are connected to a lower portion of the tractor chassis for limited universal movement, and lateral movement thereof is limited by conventional sway blocks (undisclosed). The forward end of the compression link 22 is connected to the tractor chassis for vertical pivotal movement about a first axis 24 and lateral pivotal movement about a second axis 26. The draft links 20 are interconnected with a pair of lift arms 28 by a pair of drop links 30. The lift arms 28 can be moved through a vertical range by a tractor-mounted cylinder 32 (see FIG. 4), as is conventional, to raise and lower the draft links 20. The tractor hydraulic system illustrated in FIG. 4 includes a source of fluid pressure or pump 34 and a fluid reservoir 36 interconnected with one side of a three-position servo control valve 38 by fluid lines 40 and 42. The second side of the servo control valve 38 is interconnected with the tractor-mounted cylinder 32 by a fluid line 43 so that when the servo control valve 38 is moved in one direction, it interconnects the hydraulic cylinder 32 with the pump 34 and when the servo control valve 38 is moved in the opposite direction, it interconnects the tractor-mounted cylinder 32 with the reservoir 36.

Figure 4:
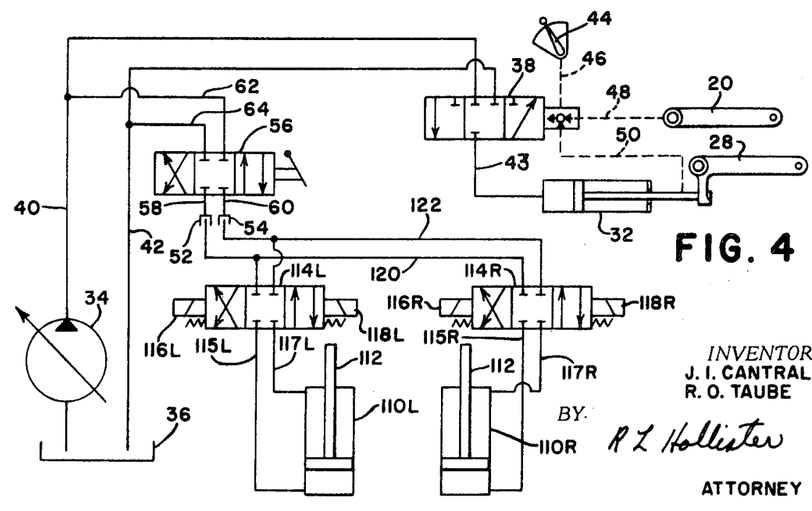
FIG. 4 is a schematic illustration of the hydraulic system employed in the present invention.

As is conventional, the control valve 38 is under the control of three initiating sources, a manual control, a draft responsive control and a position responsive control. The manual control takes the form of a rockable and selectively settable hand lever 44 which is mounted on the tractor in any suitable manner and connected to the control valve 38 by a suitable linkage represented by the dotted line 46. The draft responsive control includes the tractor draft links 20 and suitable linkage represented by the dotted lines 48 which signal the draft forces imposed upon the links 20 to the control valve 38. The position responsive control consists of suitable linkage represented by the dotted lines 50 which signals the relative position of the lift arms 28 to the control valve 38. The construction and operation of the control valve and its three initiating sources of control are all conventional and need not be elaborated. It is only necessary to understand that with the conventional structure, the tractor operator can select whether the control valve 38 should be draft responsive, position responsive, or a combination of the two. If necessary, a full understanding of the operation of the control valve 38 and its three initiating sources of control can be had by referring to U. S. Pat. No. 2,864,295 issued 16 Dec. 1958 to W. H. DuShane. The tractor hydraulic system also includes a pair of remote function outlets 52 and 54 which are interconnected with one side of a four-way directional flow control valve 56 by fluid lines 58 and 60. The opposite side of the control valve 56 is interconnected with the fluid lines 40 and 42 by additional fluid lines 62 and 64.

The disclosed implement includes a center frame section which consists essentially of a transversely extending beam 66 and a longitudinally extending beam 68 having its forward end secured to the beam 66 medially the ends thereof. The transverse beam 66 is provided with hitch pins (undisclosed) at its opposite ends which extend through the conventional apertured balls at the rear ends of the draft links 20. A mast in the form of a pair of upstanding posts 70 is secured to the forward end of the beam 68, and the rear end of the compression link 22 is secured between the posts 70 to provide the third connection between the center frame section of the implement and the tractor three-point hitch. The posts 70 are reinforced by a brace 72 which extends between the upper ends of the posts 70 and the rear end of the beam 68.

A pair of upper and lower plates 74 and 76 are secured to the rear end of the longitudinally extending beam 68, and the ends thereof extend laterally beyond the sides of the beam 68. A pair of elongated support tubes 78 have their ends mounted between the ends of the upper and lower plates 74 and 76 for horizontal swinging movement by pins 80 which extend through the plates 74 and 76 and through the support tubes 78. The pins 80 also extend through collars 82 mounted on the ends of the support tubes 78.

The support tubes 78 serve to mount the outer frame sections to the center frame section. The outer frame sections are identical except for being right- and left-hand frame sections. Each outer frame section includes a pivot tube 84 pivotally mounted on the support tube 78, a length of right-angle iron 86 secured to the pivot tube, and an elongated box beam 88 having one end secured to the forward ends of the pivot tube and right-angle iron and extending at a right angle therefrom. Each of the outer frame sections or box beams 88 is free to pivot vertically with respect to the center frame section by movement of its pivot tube 84 about the support tube 78, and can also be pivoted rearwardly to a transport position by movement about the pivot pin 80. Although not disclosed, the forward ends of the support tubes 78, when in the working position illustrated in FIG. 1, are supported on the transverse beam 66 of the center frame section in any suitable manner. The outer frame sections are maintained in their forward working position illustrated in FIG. 1 by draft cables 90 which have their rear ends secured to the respective beams 88 by clamps 92 and their forward ends secured to support members 94 on a forward portion of the tractor.

The outer end of each beam 88 is supported by a gauge wheel assembly indicated generally at 96. Each gauge wheel assembly includes an arm 98 having one end clamped to its respective beam and extending upwardly and forwardly therefrom. Pivotally connected to the forward end of each arm 98 are the rear ends of pairs of upper and lower links 100 and 102 which have their forward ends pivotally connected to an elongated hub or sleeve member 104. The wheel 106 of each gauge wheel assembly is rotatably mounted on the lower end of a wheel-mounting member 108 which has its upper end rotatably mounted within the respective hub 104. The elongated hub 104, the links 100 and 102, and the forward end of the arm 98 of each gauge wheel assembly form a four-bar linkage which permits vertical adjustment of the beam 88 of the wheel 106. The four-bar linkage positions the wheel 106 well in advance of the beam 88 and in substantial transverse alignment with the rear wheels 16 of the tractor so that all three sections of the implement frame are supported from substantially transverse aligned points. This will maintain the three frame sections in substantially the same plane as the tractor and implement travel over undulating terrain.

The outer ends of the left- and right-hand outer frame sections are raised and lowered on their respective gauge wheels 106 by double-acting extensible and retractable hydraulic cylinders 110L and 110R. Each of the hydraulic cylinders 110 has an anchor end pivotally connected to a lug on the forward end of its respective gauge wheel assembly arm 98, and the rod 112 projecting from the opposite end thereof is pivotally connected to a lower end of its respective hub 104. With this construction, extension of the cylinders 110 will raise the outer frame sections and retraction of the cylinders 110 will lower the outer frame sections.

The rod and anchor ends of the cylinders 110L and 110R are interconnected with one side of a pair of double solenoid, spring-centered, four-way directional flow control valves 114L and 114R, respectively, by fluid lines 115 and 117. The solenoid valves 114 are mounted on the left- and right-hand outer frame sections and their opposite sides are interconnected with the tractor-mounted remote function outlets 52 and 54 by fluid lines 120 and 122. As can be seen from FIG. 1, the fluid lines 120 and 122 extend from the remote function outlets 52 and 54 through the fore-and-aft beam 68 of the center frame section, and at the rear of the beam 68 they are split by T's 124 and one branch of each line extends between one of the pivot tubes 84 and right-angle iron 86 and then through the box beam 88. The fluid lines 102 and 122 emerge from the box beams 88 at couplings 126 near the valves 114.

When the tractor hydraulic system is to be used with the control system according to the present invention, the valve 56 is moved to the left to interconnect the fluid lines 122 and 120 with the pump 34 and reservoir 36, respectively. Fluid is then selectively and alternately supplied to and exhausted from the cylinders 110 by movement of the respective valves 114 from the neutral position. The term "alternately" is used herein to indicate that when one end of one of the hydraulic cylinders is interconnected with the pump, the other end of the same hydraulic cylinder is interconnected with the reservoir and vice versa.

The valve 114L is moved to opposite sides of its neutral position by selective activation of its solenoids 116L and 118L, and the valve 114R is moved to opposite sides of its neutral position by selective activation of its solenoids 116R and 118R.

Figure 7:
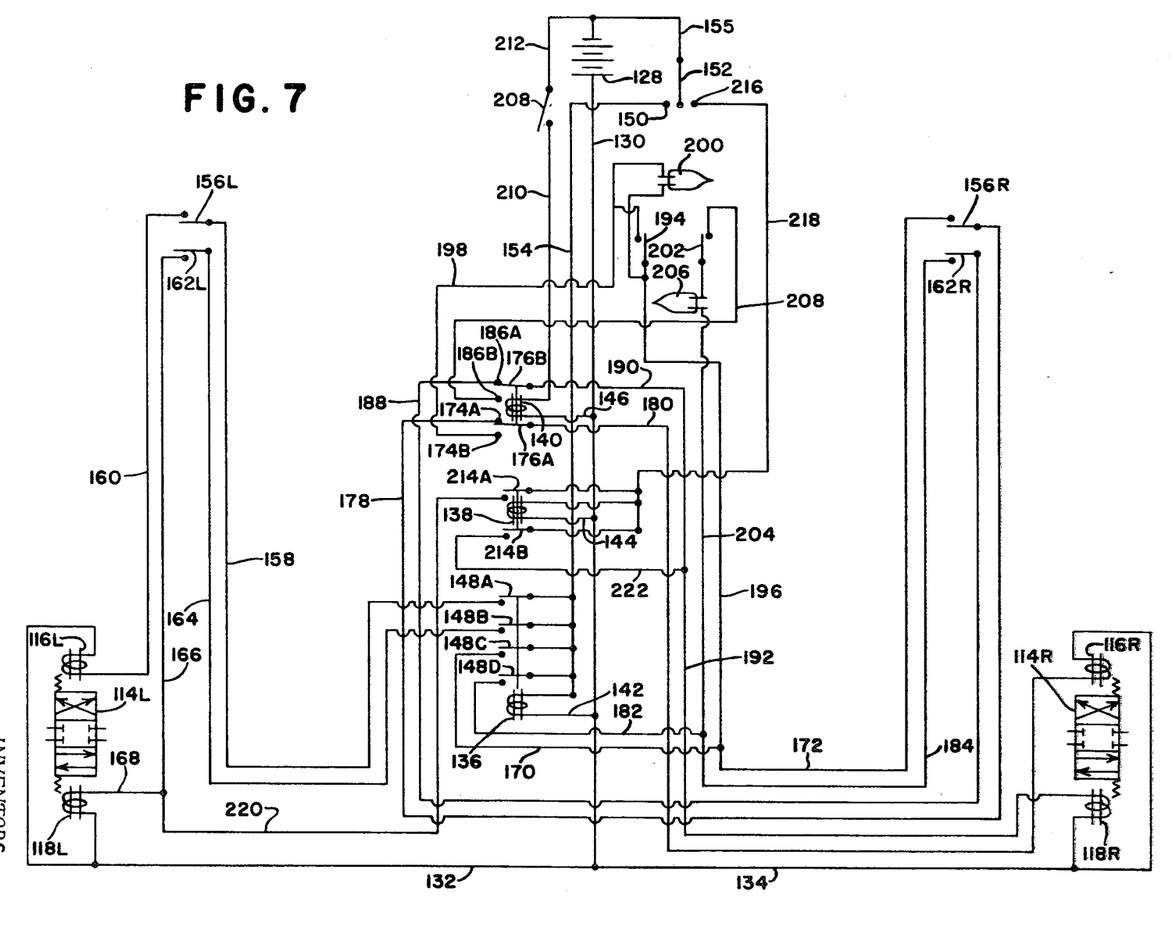

The circuitry of the electrical system controlling the solenoid valves 114 is illustrated in FIG. 7. As can be seen in FIG. 7, one side of each of the solenoids 116L and 118L are interconnected with the positive side of a source of electrical energy, the tractor battery, 128 by electrical lines 130 and 132. One side of each of the solenoids 116R and 118R is also connected to the positive side of the battery 128 by electrical lines 130 and 134. Additional solenoids 136, 138 and 140 also have one side connected to the positive side of the tractor battery 128 by the electrical line 130 and additional electrical lines 142, 144 and 146, respectively. The solenoid 136, when activated, closes a bank of normally open switches 148A-148D. One terminal of each of the switches 148A-148D and the solenoid 136 are all connected in parallel and with one terminal 150 of a three-position manually operated switch 152 by electrical line 154. The wiper of the switch 152 is connected to the negative side of the battery 128 by an electrical line 155 so that when the wiper of the switch 152 is moved to the terminal 150, the solenoid 136 is energized to close the switches 148.

The second terminal of the switch 148A is interconnected with one terminal of a microswitch 156L by an electrical line 158 and the second terminal of the microswitch 156L is interconnected with the second side of the solenoid 116L by an electrical line 160. The second terminal of the switch 148B is interconnected with one terminal of a microswitch 162L by an electrical line 164, and the second terminal of the microswitch 162L is interconnected with the second side of the solenoid 118L by electrical lines 166 and 168. The second terminal of the switch 148C is interconnected with one terminal of a microswitch 156R by electrical lines 170 and 172, and the second terminal of the microswitch 156R is interconnected with one terminal 174A of a two-position switch 176A by an electrical line 178. The wiper of the switch 176A is interconnected with the second side of the solenoid 116R by an electrical line 180. The second terminal of the switch 148D is interconnected with one terminal on a microswitch 162R by electrical lines 182 and 184, and the second terminal of the microswitch 162R is interconnected with a terminal 186A of a two-position switch 176B by an electrical line 188. The wiper of the switch 176B is interconnected with the second side of the solenoid 118R by electrical lines 190 and 192.

The second terminal of the switch 148C is also interconnected with a terminal on a microswitch 194 by the electrical line 170 and an electrical line 196, and the second terminal of the microswitch 194 is interconnected with a second terminal 174B of the switch 176A by an electrical line 198. A mercury switch 200 is connected between the electrical lines 196 and 198 for reasons which will be explained hereinafter. The second terminal of the switch 148D is also interconnected with one side of a microswitch 202 by the electrical line 182, an electrical line 204 and a mercury switch 206. The purpose of the mercury switch 206 will be explained hereinafter. The second terminal of the microswitch 202 is interconnected with a second terminal 186B of the switch 176B by electrical line 209.

The wipers of the switches 176A and 176B are normally in contact with the terminals 174A and 186A so that when the wiper of the switch 152 is in contact with terminal 150, the circuit interconnecting the solenoids 116R and 118R with the battery 128 includes the microswitches 156R and 162R. When the wipers of the switches 176A and 176B are moved into contact with the terminals 174B and 186B, respectively, the circuit between the solenoids 116R and 118R and the battery 128 includes the microswitches 194 and 202. The wipers of the switches 176A and 176B are under the control of and can be moved to an alternate position by the solenoid 140 which has its second side connected with one terminal of a manually operable switch 208 by electrical line 210. The wiper of the switch 208 is connected to the negative terminal of the battery 128 by an electrical line 212 so that when the switch 208 is closed, the solenoid 140 is activated and the wipers of the switches 176A and 176B are moved into contact with their terminals 174B and 186B respectively.

The solenoid 138 controls a bank of normally open switches 214A and 214B. One terminal of each of the switches 214A and 214B and the second side of the solenoid 138 are all connected in parallel and with an additional terminal 216 of the switch 152 by an electrical line 218. The second terminal of the switch 214A is interconnected with the solenoid 118L by an electrical line 220 and the electrical line 168. The second terminal of the switch 214B is interconnected with the solenoid 118R by an electrical line 222 and the electrical line 192. With this construction, it can be seen that movement of the wiper of the switch 152 from the terminal 150 to the terminal 216 renders all the microswitches inoperative and provides a direct circuit between the solenoids 118L and 118R and the battery 128.

The microswitches 156 and 162 are mounted on and form part of depth sensing means indicated generally at 224 on each of the outer frame sections. Each of the depth sensing means includes a mounting arm 226 secured to its respective outer frame section by a U-bolt 228. The arm 226 extends forwardly from its respective box beam 88 and has a square mounting bar 230 secured to and depending from its forward end. A sleeve 232 is slidably mounted on the mounting bar 230 and is secured in any adjusted position thereon by a set screw 234. A vertically extending plate 236 is secured to one side of the sleeve 232 and has an arm 238 pivotally mounted on a lower end thereof by a pivot bolt 240. The arm 238 is pivotally mounted intermediate its ends, has a ground follower or wheel 242 rotatably mounted at its forward end, and its rearward end extends to the rear of the plate 236 and is normally biased upwardly by a spring 244 anchored between a first lug 246 on the arm 238 and a second lug 248 secured to the plate 236 above the arm 238.

Any pivotal movement of the arm 238 is transmitted to the microswitches 156 and 162 by a spring strap 250 which has its forward end secured to a journal block 252 integral with the arm 238. The microswitches 156 and 162 are secured to a mounting strap 254 above and below, respectively, the rear end of the spring strap 250 so that upon any movement of the spring strap 250 one of the switches will be closed. The mounting strap 254 is secured to the plate 236 by bolts 256 and is spaced from the plate 236 by spacers 258 mounted on the bolts 256.

Although FIG. 1 illustrates the depth sensing means 224 as being secured to the outer ends of the beams 88, they may be mounted on the beams 88 at any desirable position along their length.

Figure 5:
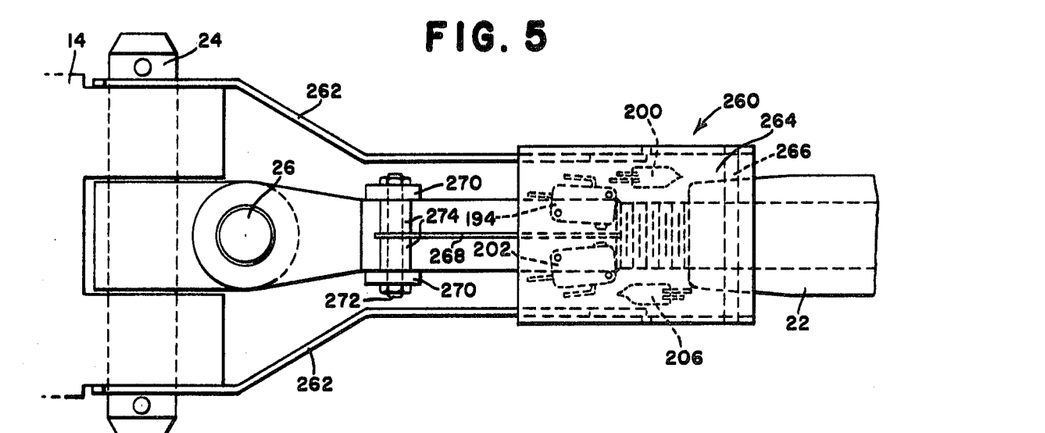
FIG. 5 is an enlarged top plan view of the forward portion of the upper tractor hitch link and of the side draft sensing means associated therewith.
Figure 6:
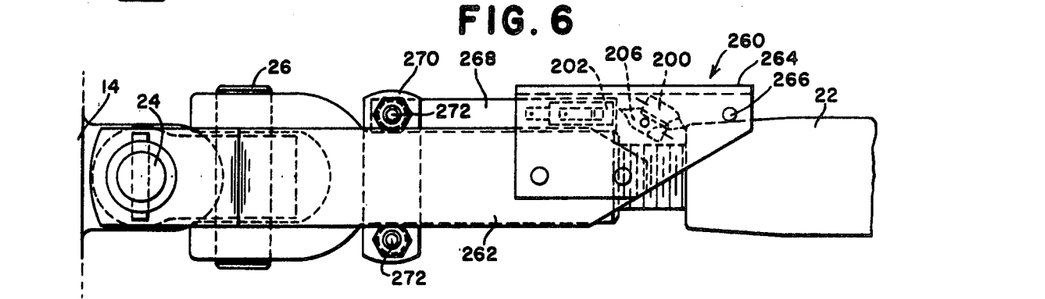
FIG. 6 is an enlarged side elevational view of the forward portion of the upper tractor hitch link and of the side draft sensing means associated therewith; and, FIG. 7 is a schematic illustration of the electrical circuitry used in the control system according to the present invention.

The microswitches 194 and 202 and mercury switches 200 and 206 are supported on and carried by a switch support 260. The switch support includes a pair of support arms 262 which have their forward ends pivotally connected to the tractor for vertical movement about the axis 24. The arms 262 extend generally alongside the upper compression link 20 and have their rear ends interconnected by an inverted U-shaped switch base 264. A spring pin 266 extends between the legs of the switch base 264 and engages the top surface of the compression link 22 to maintain the bight of the switch base spaced above the compression link.

The microswitches 194 and 202 are secured to the base 264 so that their actuating buttons are positioned on opposite sides of and face a vertical plane extending through the longitudinal centerline of the upper compression link 22. The mercury switch 206 is secured to the switch base 264 in an attitude so that it is closed when the tractor hitch is adjusted within the normal working range of the implement 12 and open when the tractor hitch and implement are raised to a transport position. The mercury switch 200 is secured to the switch base 264 in an attitude so that it is open when the tractor hitch is adjusted within a normal working range of the implement 12 and closed when the tractor hitch and implement are raised to a transport position.

The microswitches 194 and 202 are selectively closed by an elongated spring strap 268 which is positioned on top of the forward end of the compression link 22, has its rear end between the actuating buttons of the microswitches 194 and 202, and has its forward end rigidly secured to the compression link 22. For the purpose of securing the forward end of the spring strap to the compression link, a pair of clamp plates 270 are secured to the sides of the compression link by bolts 272 which extend across the top and bottom of the compression link. The forward end of the spring strap 268 is apertured and the upper bolt 272 extends through the aperture in the spring strap. The spring strap is maintained in a center position on the upper bolt 272 by a pair of spacers 274 mounted on the upper bolt 272 and positioned between the clamp plates 270 and spring strap 268. With the spring strap 268 secured to the compression link 22, lateral movement of the compression link about the pivot 26 will cause lateral movement of the spring strap so that the rear end of the spring strap contacts one of the actuating buttons of the microswitches 194 and 202 and closes the respective microswitch. Since the spring strap has one end rigidly secured to the compression link and moves with the compression link, it may be considered part of the compression link.

The operation of the control system is as follows. Assuming that sleeves 232 have been adjusted on the mounting bar to set the ground feeler wheels 242 at the desired position with respect to the beams 88, the implement is in a raised transport position, the manually operable switches 152 and 208 are open as illustrated in FIG. 7, and the valve 56 has been moved to the left to interconnect the pump 34 and reservoir 36 with the solenoid valves 114L and 114R, the operator starts a pass through the field by manipulation of the control lever 44 to lower the center frame section to the desired position and by moving the wiper of the switch 152 into contact with the terminal 150. With the wiper of switch 152 in contact with the terminal 150, the solenoid 136 is actuated to close the switches 148A–148D to establish a circuit between the battery 128 and the solenoids 116L, 116R, 118L and 118R. The circuits for the solenoids 116L and 118L include the microswitches 156L and 162L, respectively, and since the manually operable switch 208 is open, the circuits for the solenoids 116R and 118R include the microswitches 156R and 162R. Since the outer frame sections are in a raised transport position, the wheels 242 of the depth sensing means 224 will be off the ground and will have pivoted the arms 238 in a clockwise direction as viewed in FIG. 2 so that the spring strap 250 will have contacted and closed the microswitches 156L and 156R. With the microswitches 156L and 156R closed, the solenoids 116L and 116R are activated to move the valves 114L and 114R from their neutral position to interconnect the rod ends of the cylinders 110L and 110R with the pump 34 and the anchor ends of the cylinders 110L and 110R with the reservoir 36 so that the cylinders are retracted and the outer frame sections are lowered on their gauge wheels 106.

As the outer frame sections approach their preselected working positions as determined by the position of the sleeves 232 on the mounting bars 230, the depth sensing wheels 242 will contact the ground and begin to pivot the arms 238 counterclockwise as viewed in FIG. 2 so that the spring strap 250 moves away from the microswitch 156. With the microswitches 156L and 156R open, the circuits between the battery 128 and solenoids 116L and 116R are broken and the valves 114L and 114R are returned to their neutral position to stop the descent of the outer frame sections.

If for some reason the position of the outer frame sections with respect to the ground surface changes, for example, if the gauge wheels 106 move into a depression or over a hump, the depth sensing wheels 242 will again pivot their respective arms 238 to move the spring strap 250 into contact with and close one of the switches 156 or 162 to actuate their respective solenoids 116 or 118 to lower or raise the outer frame sections to the predetermined working position.

Because of the width of the implement 12, the tools or lister bottoms 276 on one of the outer frame sections may be working in harder soil than the lister bottoms 276 on the other outer frame section. This condition will create unbalanced draft loads on the tractor hitch which makes it impossible to steer the tractor and make straight rows. In such a case, the operator of the tractor can close the manually operable switch 208 to activate the solenoid 140 so that the wipers of the switches 176A and 176B move from the terminals 174A and 186A, respectively, into contact with the terminals 174B and 186B, respectively. With the wipers of the switches 176A and 176B in contact with the terminals 174B and 186B, respectively, the circuits between the battery 128 and the solenoids 116R and 118R include the microswitches 194 and 202 which will be closed in response to unbalanced draft loads on the tractor hitch. For example, if the draft forces on the right-hand outer frame section are greater than those on the left-hand outer frame section, the right-hand draft link 20 will be forced against its sway block. As the right-hand draft link 20 is moved to the left against its sway block, the upper compression link 22 is also moved to the left due to the three-point connection between the center frame section of the implement and the tractor hitch. As the upper compression link 22 is moved to the left, the spring strap 268 is moved to the left to contact and close the microswitch 202 which completes the circuit and activates the solenoid 118R. Activation of the solenoid 118R moves the valve 114R in a direction to interconnect the anchor end of the cylinder 110R with the pump 34 and the rod end of the cylinder 110R with the reservoir 36 so that the right-hand outer frame section is raised to decrease the draft loads on the right-hand side of the tractor hitch.

As the draft loads on the opposite sides of the tractor hitch again approach a balanced condition due to the raising of the right-hand outer frame section, the draft link on the right-hand side of the tractor hitch will move away from its sway block and the upper compression link 22 will move back to a centered position. As the upper compression link 22 moves back to the center position, the spring strap 268 moves away from the microswitch 202 so that the microswitch 202 will open and the solenoid 118R will be deactivated and the valve 114R returned to the neutral position.

If the draft loads on the left-hand side of the outer frame section are greater than the draft loads on the right-hand outer frame section, the microswitch 194 will be closed by the spring strap 268 so that the solenoid 116R is activated and the right-hand outer frame section lowered.

It should be noted that when the implement is in the working position the mercury switch 206 is in an attitude so that it is closed and the mercury switch 200 is in an attitude so that it is open and hence has no effect on the circuitry since it is connected in parallel with the microswitch 194.

When the operator desires to raise the implement 12 to a transport position, for example, when he reaches the end of a pass through a field, he merely moves the lever 44 to a raise position so that the tractor three-point hitch raises the center frame section of the implement and moves the wiper of the manually operable switch 152 away from the terminal 150 into contact with the terminal 216. With the wiper of the switch 152 in contact with the terminal 216, the solenoid 136 is deactivated and the bank of switches 148 return to their normally open position, and the solenoid 138 is activated to close the switches 214 to establish a direct circuit between the battery 128 and solenoids 118L and 118R. Thus, movement of the wiper of the switch 152 into contact with the terminal 216 activates the solenoids 118L and 118R and the valves 114 are moved in a direction to interconnect the anchor ends of the cylinders 110 with the pump 34 and the rod ends of the cylinders with the reservoir 36 so that the cylinders 110 are extended and outer frame sections are raised to a transport position.

As the implement is raised to a transport position, the compression link 22 and hence the switch support 260 are pivoted upwardly about the axis 24. The upward movement of the switch support 260 changes the attitude of the mercury switches 200 and 206 so that the mercury switch 200 is closed and the mercury switch 206 is open. With the mercury switch 200 closed, the microswitch 194 is bypassed so that if the operator moves the wiper of the switch 152 into contact with the terminal 150 to lower the outer frame sections while the switch 208 is closed, there will be a completed circuit through the mercury switch 200 and the solenoid 116R will be activated without the microswitch 194 being closed. Thus, even though the solenoids 116R and 118R are only responsive to unequal draft loads on the tractor hitch when the switch 208 is closed, the mercury switch 200 will provide the necessary down signal to the solenoid 116R when the implement is to be lowered to a working position.

The mercury switch 206 prevents a raise signal from being transmitted to the solenoid 118R when the switch 208 is closed and it is desired to lower the implement from its transport position to the selected working position. For example, if the operator is still making a turn when he attempts to lower the outer frame sections of the implement, the right-hand draft link may be moved against its sway block, and hence the compression link may be moved to the left so that the spring strap 268 contacts and closes the microswitch 202. Without the mercury switch 206, the closing of the microswitch 202 would provide a signal to the solenoid 118R which will in effect cancel the signal provided to the solenoid 116R through the mercury switch 200. However, the mercury switch 206 is open when the implement 12 is in the raised transport position so that closing of the microswitch 202 will not cause the solenoid 118R to be activated.

From the foregoing, it can be seen that the present invention provides a control system for an integral flexible implement which selectively provides depth control for both outer frame sections of the implement or depth control of one of the outer frame sections and side draft control for the other outer frame section.

Although only a single preferred embodiment of the invention has been described and illustrated, various modifications within the spirit and scope of the invention will become apparent to those skilled in the art and can be made without departing from the underlying principles of the invention. Therefore, the invention should not be limited by the specific illustration and description, but only by the following claims.

We claim:

1. A control system for use with a tractor and flexible implement arrangement in which the tractor includes a source of fluid pressure, a fluid reservoir, and a power-operated hitch movable through a vertical range and the implement includes a center frame section connected to the tractor hitch to be raised and lowered thereby between raised transport and lowered working positions, a pair of transversely extending outer frame sections having inner ends pivotally connected to the center frame section for vertical movement, a pair of gauge wheel means adjustably secured to and supporting the outer frame sections, and a pair of hydraulic cylinders connected between the outer frame sections and the gauge wheel means to raise and lower the outer frame sections on the gauge wheel means when supplied with fluid under pressure and when fluid is exhausted therefrom, the control system comprising: means including valve means interconnecting each of the hydraulic cylinders with the tractor source and reservoir; each of the valve means being movable to opposite sides of a neutral fluid blocking position to selectively interconnect its respective cylinder with the source and reservoir; depth sensing means secured to each of the outer frame sections operatively interconnected with the valve means and each being responsive to deviation of its respective outer frame section from a selected working position with respect to the ground to move its respective valve means from the neutral position to adjust the respective outer frame section on its gauge wheel to the predetermined working position; manually-operable means operatively interconnected with the depth sensing means and their respective valve means to selectively render the depth sensing means inoperative and move the valve means in a direction to interconnect the hydraulic cylinders with the source and thereby raise the outer frame sections to a transport position; draft load sensing means on the tractor operatively interconnected with one of the valve means and responsive to unbalanced draft loads on opposite sides of the tractor hitch to move the one valve means from its neutral position in a direction to vertically adjust the respective outer frame section in a direction to establish balanced draft loads on opposite sides of the tractor hitch; and second manually operable means operatively interconnected with both the depth sensing means for the one valve means and the draft load sensing means to selectively and alternately bring the one valve means under the control of one of the sensing means therefor and render the other sensing means for the one valve means inoperative.

2. The control system set forth in claim 1 further including draft load sensing means on the tractor operatively interconnected with one of the valve means and responsive to unbalanced draft loads on opposite sides of the tractor hitch to move the one valve means from its neutral position in a direction to vertically adjust the respective outer frame section in a direction to establish balanced draft loads on opposite sides of the tractor hitch, and second manually operable means operatively interconnected with both the depth sensing means for the one valve means and the draft load sensing means to selectively and alternately bring the one valve means under the control of one of the sensing means therefore and render the other sensing means for the one valve means inoperative.

3. The control system set forth in claim 2 wherein the first mentioned manually operable means is operatively interconnected with the draft load sensing means to render the draft load sensing means inoperative when it renders the depth sensing means inoperative.

4. The control system set forth in claim 3 wherein the draft load sensing means includes means responsive to lateral movement of the tractor hitch as caused by unequal draft loads on opposite sides of the hitch to move the one valve means from its neutral position in a direction to vertically adjust the respective outer frame section in a direction to establish balanced draft loads on opposite sides of the tractor hitch.

5. The control system set forth in claim 1 wherein each of the depth sensing means is adjustably secured on its respective outer frame section whereby, by vertically adjusting the position of the depth sensing means on its respective outer frame section, the position of the outer frame section with respect to the ground surface can be varied.

6. The control system set forth in claim 5 wherein each of the depth sensing means is secured to and extends forwardly of its respective outer frame section to sense the position of its respective outer frame section with respect to the ground surface forwardly of its respective outer frame section.

7. The control system set forth in claim 1 wherein each of the valve means is a double solenoid valve having a pair of solenoids, and each of the depth sensing means includes an arm mounted on its respective outer frame section for vertical pivotal movement, ground surface follower means on the free end of the arm, a pair of normally open switch means mounted on the outer frame section above and below the arm in positions to be contacted and closed thereby, and a pair of electrical circuits including the pair of switch means interconnecting the pair of solenoids of the respective valve means with a source of electrical energy, whereby, upon deviation of the outer frame section from a selected position with respect to the ground surface, the ground surface follower moves the arm vertically to contact and close one of the switch means and activate one of the solenoids.

8. The control system set forth in claim 7 wherein activation of one of the solenoids of each of the valve means moves the valve means in a direction to interconnect the respective cylinder with the source of fluid pressure and activation of the other of the solenoids of each of the valve means moves the valve means in a direction to interconnect the respective hydraulic cylinder with the reservoir, additional electrical circuits interconnect the one solenoid of each of the valve means with the source of electrical energy, and the manually operable means to selectively render the depth sensing means inoperative and move the valve means in a direction to interconnect the hydraulic cylinders with the source of fluid pressure includes a manually operable switch means to selectively complete the first-mentioned circuits or the additional circuits.

9. The control system set forth in claim 8 wherein the manually operable switch means consists of a single switch common to all the circuits and movable between a first position in which it completes the first-mentioned circuits and a second position in which it completes the additional circuits.

10. The control system set forth in claim 7 wherein a mounting plate is vertically adjustable on each of the outer frame sections and is securable in any adjusted position, the arm of each depth sensing means is pivotally mounted on its respective mounting plate, and the pair of switch means for the respective valve means are secured on the mounting plate, whereby the selected position of each outer frame section with respect to the ground surface can be varied by varying the position of the mounting plates on the outer frame sections.

11. A control system for use with a tractor and flexible implement arrangement in which the tractor includes a source of fluid pressure, a fluid reservoir and a power-operated hitch movable through a vertical range and the implement includes a center frame section connected to the tractor hitch to be raised and lowered thereby between raised transport and lowered working positions, a pair of transversely extending outer frame sections having inner ends pivotally connected to the center frame section for vertical movement, a pair of gauge wheel means adjustably secured to and supporting the outer frame sections, and a pair of hydraulic cylinders connected between the outer frame sections and the gauge wheel means to raise and lower the outer frame sections on the gauge wheel means when supplied with fluid under pressure and when fluid is exhausted therefrom, respectively, the control system comprising: means including valve means interconnecting each of the hydraulic cylinders with the tractor source and reservoir; each of the valve means being movable to opposite sides of a neutral fluid blocking position to selectively interconnect its respective cylinder with the source or reservoir; depth sensing means secured to one of the outer frame sections operatively interconnected with the valve means controlling the flow of fluid to and from the hydraulic cylinder connected to the one outer frame section and responsive to deviation of the one outer frame section from a predetermined working position with respect to the ground surface to move its respective valve means from the neutral position in a direction to return the one outer frame section to the predetermined working position; and draft sensing means on the tractor operatively interconnected with the valve means controlling the flow of fluid to and from the hydraulic cylinder connected to the other outer frame section and responsive to unequal draft loads on opposite sides of the tractor hitch to move its respective valve means from the neutral position in a direction to vertically adjust the other outer frame section to balance the draft loads on the opposite sides of the tractor hitch whereby the one outer frame section is maintained at the predetermined working position and the other outer frame section is adjusted to maintain balanced draft loads on the tractor.

12. The control system set forth in claim 4 further including manually operable means operatively interconnected with the sensing means and their respective valve means to selectively render the sensing means inoperative and move the valve means in a direction to interconnect the hydraulic cylinders with the source.

13. The control system set forth in claim 12 wherein the draft sensing means includes means to move its respective valve means in a direction to interconnect the respective hydraulic cylinder with the reservoir irrespective of the draft loads on opposite sides of the tractor hitch when the draft sensing means is operative and the implement is raised above a predetermined position.

14. The control system set forth in claim 11 wherein each of the valve means is a solenoid valve, the depth sensing means includes a member movable in response to deviation of the one outer frame section from a preselected position with respect to the ground surface, normally open switch means mounted on the one outer frame section in a position to be contacted and closed by the movable member, and first electrical circuit means including the switch means interconnecting the respective solenoid valve with a source of electrical energy whereby, upon deviation of the one outer frame section from the preselected position with respect to the ground surface, the movable member closes the switch means to activate the respective solenoid valve and vertically adjust the one outer frame section, and the draft sensing means includes normally open switch means mounted on the tractor in a position to be contacted and closed by the tractor hitch upon lateral movement thereof, and second electrical circuit means including the tractor-mounted switch means interconnecting the respective solenoid valve with the source of electrical energy whereby unequal draft loads on the tractor will cause the tractor hitch to move laterally and close the tractor-mounted switch means to activate the respective solenoid valve and vertically adjust the other outer frame section.

15. A control system for use with a tractor and flexible implement arrangement in which the tractor has a source of fluid pressure, a fluid reservoir, and a power-operated hitch movable through a vertical range and including a pair of lower draft links and an upper compression link connected to the tractor for limited universal movement, and the implement includes a center frame section integrally connected to the tractor hitch links to be raised and lowered thereby between raised transport and lowered working positions, a pair of transversely extending outer frame sections pivotally connected to the center frame section for independent vertical movement, a pair of gauge wheel means adjustably secured to and supporting the outer ends of the outer frame sections, and a pair of double-acting hydraulic cylinders having rod and anchor ends connected between the outer frame sections and their respective gauge wheel means to raise and lower the outer frame sections when fluid under pressure is supplied to their anchor and rod ends respectively, the control system comprising: a pair of four-way directional flow control valve means interconnected with the tractor source and reservoir for controlling the flow of fluid from the source and to the reservoir; a pair of fluid line means interconnecting each of the valve means with the rod and anchor ends of one of the hydraulic cylinders; each of the valve means being movable to one side of a neutral fluid blocking position to interconnect the rod and anchor ends of its respective cylinder with the source and reservoir and to the other side of the neutral position to interconnect the rod and anchor ends of its respective cylinder with the reservoir and source; depth sensing means secured to one of the outer frame sections operatively connected with the valve means controlling the flow of fluid to and from the hydraulic cylinder connected to the one outer frame section and responsive to deviation of the one outer frame section from a predetermined working position with respect to the ground surface to move its respective valve means from the neutral position to interconnect the rod and anchor ends of the respective cylinder with the source and reservoir when the one outer frame section is above the predetermined working position and to interconnect the rod and anchor ends of the respective cylinder with the reservoir and source when the one outer frame section is below the predetermined working position; and draft load sensing means on the tractor operatively interconnected with the valve means controlling the flow of fluid to and from the hydraulic cylinder connected to the other outer frame section and responsive to unbalanced draft loads on opposite sides of the tractor hitch to move its respective valve means from the neutral position to interconnect the rod and anchor ends of the respective cylinder with the tractor source and reservoir when the draft load imposed upon the tractor hitch by the other outer frame section is less than the draft load imposed upon the tractor hitch by the one outer frame section and to interconnect the rod and anchor ends of the respective cylinder with the tractor reservoir and source when the draft load imposed upon the tractor hitch by the other outer frame section is greater than the draft load imposed upon the tractor hitch by the one frame section.

16. The control system set forth in claim 15 further including manually operable means operatively interconnected with the depth and draft load sensing means and their respective valve means to selectively render the depth and draft load sensing means inoperative and move the valve means from their neutral positions to interconnect the rod and anchor ends of the hydraulic cylinders with the tractor reservoir and source.

17. The control system set forth in claim 16 wherein the draft load sensing means includes means mounted on the tractor in a position to be contacted and moved by at least one of the hitch links upon lateral movement thereof as the result of unbalanced draft loads on the tractor hitch.

18. The control system set forth in claim 16 wherein each of the valve means is a double solenoid valve having a pair of solenoids, the depth sensing means includes an arm mounted on the one outer frame section for vertical pivotal movement, ground surface follower means on the free end of the arm, a pair of normally open switch means mounted on the outer frame section above and below the arm in positions to be contacted and closed thereby, and a pair of electrical circuits each including one of the switch means of the pair of switch means interconnecting the pair of solenoids of the valve means controlling the flow of fluid to and from the hydraulic cylinder connected to the one outer frame section with a source of electrical energy, and the draft load sensing means includes a second pair of normally open switch means mounted on the tractor on opposite sides of the longitudinal centerline of one of the tractor hitch links in positions to be contacted and closed thereby upon lateral movement thereof, and a second pair of electrical circuits each including one of the switch means of the second pair of switch means interconnecting the pair of solenoids of the valve means controlling the flow of fluid to and from the hydraulic cylinder connected to the other outer frame section with the source of electrical energy.

19. The control system set forth in claim 18 wherein activation of one of the solenoids of each of the valve means moves the valve means in a direction to interconnect the rod and anchor ends of the cylinders with the tractor source and reservoir and activation of the other of the solenoids of each of the valve means moves the valve means in a direction to interconnect the rod and anchor ends of the cylinders with the tractor reservoir and source, an additional pair of electrical circuits interconnect the other solenoids of the valve means with the source of electrical energy, and the manually operable means includes a manually operable switch common to all the electrical circuits and selectively movable between a first position in which it completes the first and second pairs of electrical circuits and a second position in which it completes the additional pair of electrical circuits.

20. A control system for use with a tractor and flexible implement arrangement in which the tractor has a source of fluid pressure, a fluid reservoir, and a power-operated hitch movable through a vertical range and including a pair of lower draft links and an upper compression link connected to the tractor for limited universal movement, and the implement includes a center frame section integrally connected to the tractor hitch links to be raised and lowered thereby between raised transport and lowered working positions, a pair of transversely extending outer frame sections pivotally connected to the center frame section for independent vertical movement, a pair of gauge wheel means adjustably secured to and supporting the outer ends of the outer frame sections, and a pair of double-acting hydraulic cylinders having rod and anchor ends connected between the outer frame sections and their respective gauge wheel means to raise and lower the outer frame sections when fluid under pressure is supplied to their anchor and rod ends respectively, the control system comprising: a pair of four-way directional flow control valve means interconnected with the tractor source and reservoir for controlling the flow of fluid from the source and to the reservoir; a pair of fluid line means interconnecting each of the valve means with the rod and anchor ends of one of the hydraulic cylinders; each of the valve means being movable to one side of a neutral fluid blocking position to interconnect the rod and anchor ends of its respective cylinder with the source and reservoir and to the other side of the neutral position to interconnect the rod and anchor ends of its respective cylinder with the reservoir and source; depth sensing means secured to each of the outer frame sections operatively connected with the valve means controlling the flow of fluid to and from the hydraulic cylinder connected to the respective outer frame section and responsive to deviations of the outer frame sections from predetermined working positions with respect to the ground surface to move their respective valve means from the neutral position to interconnect the rod and anchor ends of the respective cylinders with the source and reservoir when the respective outer frame section is above the predetermined working position and to interconnect the rod and anchor ends of the respective cylinders with the reservoir and source when the respective outer frame section is below the predetermined working position; draft load sensing means on the tractor operatively interconnected with the valve means controlling the flow of fluid to and from the hydraulic cylinder connected to one of the outer frame sections and responsive to unbalanced draft loads on opposite sides of the tractor hitch to move its respective valve means from the neutral position to interconnect the rod and anchor ends of the respective cylinder with the tractor source and reservoir when the draft load imposed upon the tractor hitch by the one outer frame section is less than the draft load imposed upon the tractor hitch by the other outer frame section and to interconnect the rod and anchor ends of the respective cylinder with the tractor reservoir and source when the draft load imposed upon the tractor hitch by the one outer frame section is greater than the draft load imposed upon the tractor hitch by the other frame section; and manually operable means operatively interconnected with the draft load sensing means and the depth sensing means for the valve means controlling the flow of fluid to and from the hydraulic cylinder connected to the one outer frame section to selectively and alternately render one of the draft sensing means and the respective depth sensing means inoperative.

21. The control system set forth in claim 20 wherein second manually operable means is operatively interconnected with both depth sensing means, the draft load sensing means, and both valve means to selectively render both depth sensing means and the draft load sensing means inoperative and move both valve means from their neutral positions to interconnect the rod and anchor ends of the cylinders with the tractor reservoir and source.

22. The control system set forth in claim 21 wherein each of the valve means is a double solenoid valve having a pair of solenoids, each of the depth sensing means includes an arm mounted on its respective outer frame section for vertical pivotal movement, ground surface follower means on the free end of the arm, a pair of normally open switch means mounted on the respective outer frame section above and below the arm in positions to be contacted and closed thereby, and a pair of electrical circuits each including one of the switch means of the pair of switch means interconnecting the pair of solenoids of the valve means controlling the flow of fluid to and from the hydraulic cylinder connected to the respective outer frame section with a source of electrical energy, and the draft load sensing means includes a further pair of normally open switch means mounted on the tractor on opposite sides of the longitudinal centerline of one of the tractor hitch links in positions to be contacted and closed thereby upon lateral movement thereof, and a further pair of electrical circuits each including one of the switch means of the additional pair of switch means interconnecting the pair of solenoids of the valve means controlling the flow of fluid to and from the hydraulic cylinder connected to the one outer frame section with the source of electrical energy.

23. The control system set forth in claim 22 wherein activation of one of the solenoids of each of the valve means moves the valve means in a direction to interconnect the rod and anchor ends of the cylinders with the tractor source and reservoir and activation of the other of the solenoids of each of the valve means moves the valve means in a direction to interconnect the rod and anchor ends of the cylinders with the tractor reservoir and source, an additional pair of electrical circuits interconnect the other solenoids of the valve means with the source of electrical energy, and the second manually operable means includes a manually operable switch common to all the electrical circuits and selectively movable between a first position in which it completes the additional pair of electrical circuits and a second position in which it completes the other electrical circuits.

24. A control system for use with a tractor and flexible implement arrangement in which the tractor has a source of fluid pressure, a fluid reservoir, and a power-operated hitch movable through a vertical range and including a pair of lower draft links and an upper compression link connected to the tractor for limited universal movement, and the implement includes a center frame section integrally connected to the tractor hitch links to be raised and lowered thereby between raised transport and lowered working positions, a pair of transversely extending outer frame sections pivotally connected to the center frame section for independent vertical movement, a pair of gauge wheel means adjustably secured to and supporting the outer ends of the outer frame sections, and a pair of double-acting hydraulic cylinders having rod and anchor ends connected between the outer frame sections and their respective gauge wheel means to raise and lower the outer frame sections when fluid under pressure is supplied to their anchor and rod ends respectively, the control system comprising: a pair of four-way directional flow control valve means interconnected with the tractor source and reservoir for controlling the flow of fluid from the source and to the reservoir; a pair of fluid line means interconnecting each of the valve means with the rod and anchor ends of one of the hydraulic cylinders; each of the valve means being movable to one side of a neutral fluid blocking position to interconnect the rod and anchor ends of its respective cylinder with the source and reservoir and to the other side of the neutral position to interconnect the rod and anchor ends of its respective cylinder with the reservoir and source; and depth sensing means secured to each of the outer frame sections operatively connected with the valve means controlling the flow of fluid to and from the hydraulic cylinder connected to the respective outer frame section and responsive to deviations of the outer frame sections from predetermined working positions with respect to the ground surface to move their respective valve means from the neutral position to interconnect the rod and anchor ends of the respective cylinders with the source and reservoir when the respective outer frame section is above the predetermined working position and to interconnect the rod and anchor ends of the respective cylinders with the reservoir and source when the respective outer frame section is below the predetermined working position.

25. The control system set forth in claim 24 further including manually operable means operatively interconnected with both depth sensing means and their respective valve means to selectively render both depth sensing means inoperative and move the valve means from their neutral positions to interconnect the rod and anchor ends of the hydraulic cylinders with the tractor reservoir and source.

26. The control system set forth in claim 25 wherein each of the valve means is a double solenoid valve having a pair of solenoids, each of the depth sensing means includes an arm mounted on its respective outer frame section for vertical pivotal movement, ground surface follower means on the free end of the arm, a pair of normally open switch means mounted on the outer frame section above and below the arm in positions to be contacted and closed thereby, and a pair of electrical circuits each including one of the switch means of the pair of switch means interconnecting the pair of solenoids of the valve means controlling the flow of fluid to and from the hydraulic cylinder connected to the respective outer frame section with a source of electrical energy.

27. The control system set forth in claim 26 wherein activation of one of the solenoids of each of the valve means moves the valve means in a direction to interconnect the rod and anchor ends of the cylinders with the tractor source and reservoir and activation of the other of the solenoids of each of the valve means moves the valve means in a direction to interconnect the rod and anchor ends of the cylinders with the tractor reservoir and source, an additional pair of electrical circuits interconnect the other solenoids of the valve means with the source of electrical energy, and the manually operable means includes a manually operable switch common to all the electrical circuits and selectively movable between a first position in which it completes the additional pair of electrical circuits and a second position in which it completes the other electrical circuits.

* * * * *

UNITED STATES PATENT OFFICE
CERTIFICATE OF CORRECTION

Patent No. 3,736,988          Dated  5 June 1973

Inventor(s) John Isaac Cantral and Robert Otto Taube

It is certified that error appears in the above-identified patent and that said Letters Patent are hereby corrected as shown below:

Column 11, lines 38-52, cancel "2. The control ... means inoperative."; line 53, change "3" to -- 2 --; same line, change "2" to -- 1 --; line 58, change "4" to -- 3 --; same line, change "3" to -- 2 --; line 66, change "5" to -- 4 --.

Column 12, line 6, change "6" to -- 5 --; same line, change "5" to -- 4 --; line 18, change "7" to -- 6 --; line 35, change "8" to -- 7 --; same line, change "7" to -- 6 --; line 51, change "9" to -- 8 --; same line, change "8" to -- 7 --; line 57, change "10" to -- 9 --; same line, change "7" to -- 6 --; line 67, change "11" to -- 10 --.

Column 13, line 39, change "12" to -- 11 --; same line, change "4" to -- 3 --; line 45, change "13" to -- 12 --; same line, change "12" to -- 11 --; line 53, change "14" to -- 13 --; same line, change "11" to -- 10 --.

Column 14, line 12, change "15" to -- 14 --.

Column 15, line 8, change "16" to -- 15 --; same line, change "15" to -- 14 --; line 16, change "17" to -- 16 --; same line, change "16" to -- 15 --; line 22, change "18" to -- 17 --; same line, change "16" to -- 15 --; line 47, change "19" to -- 18 --; same line, change "18" to -- 17 --; line 65, change "20 to -- 19 --.

Column 17, line 1, change "21" to -- 20 --; same line, change "20" to -- 19 --; line 10, change "22" to -- 21 --; same line, change "21" to -- 20 --; line 36, change "23" to -- 22 --; same line, change "22" to -- 21 --; line 53, change "24" to -- 23 --.

Column 18, line 33, change "25" to -- 24 --; same line, change "24" to -- 23--; line 41, change "26" to -- 25 --; same line, change "25" to -- 24 --; line 46, change "27" to -- 26 --; same line, change "26" to -- 25 --.

Signed and sealed this 20th day of November 1973.

(SEAL)
Attest:

EDWARD M. FLETCHER, JR.
Attesting Officer

RENE D. TEGTMEYER
Acting Commissioner of Patents